F. E. IVES.
PHOTOGRAPHIC CAMERA.
APPLICATION FILED FEB. 17, 1916.
1,287,327.
Patented Dec. 10, 1918.
3 SHEETS—SHEET 1.
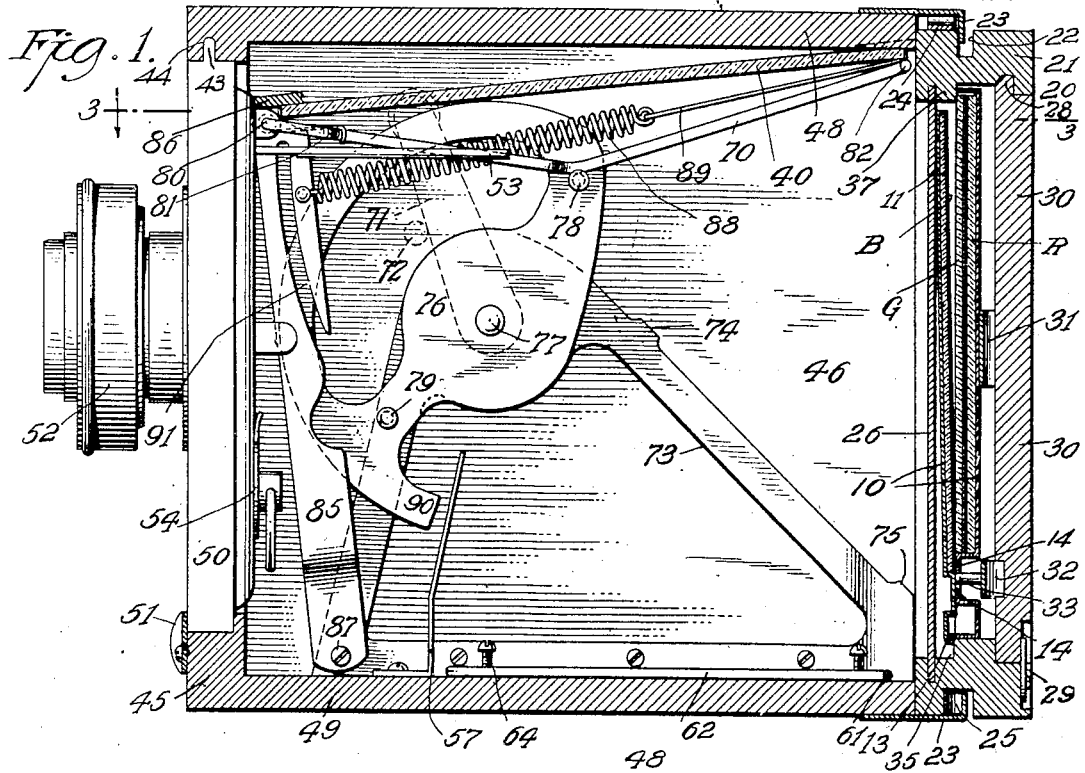
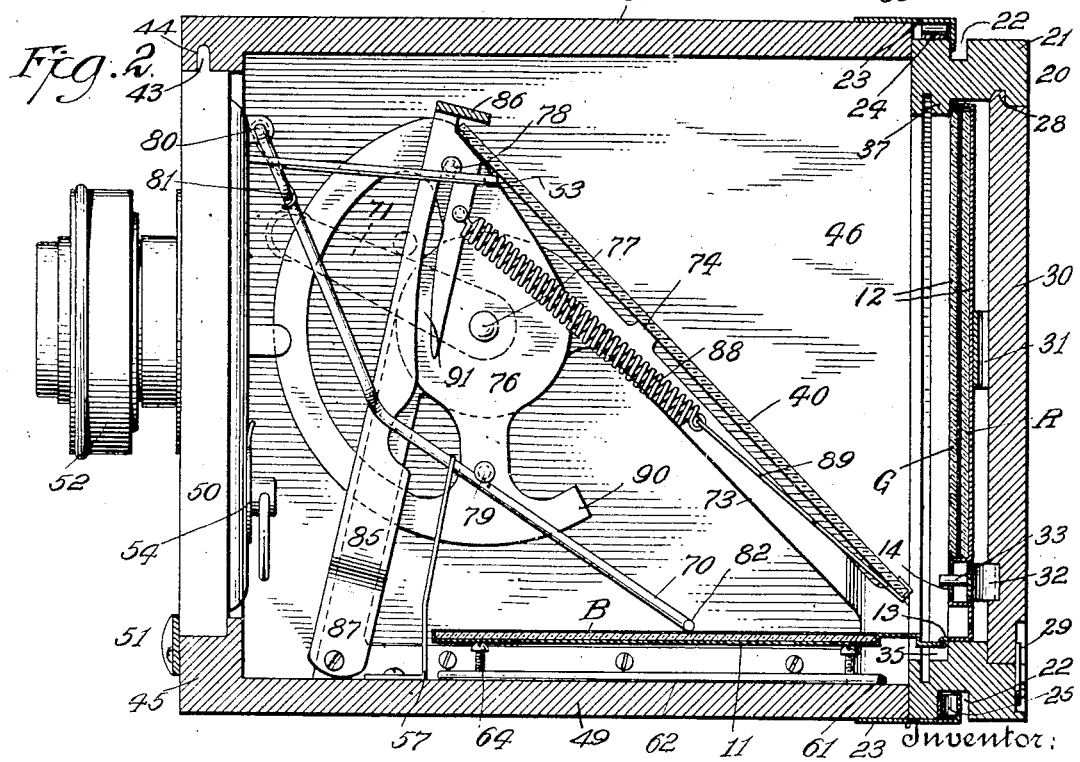
Inventor:
Frederic E. Ives,
By his Attorneys
Rogers, Kennedy & Campbell.

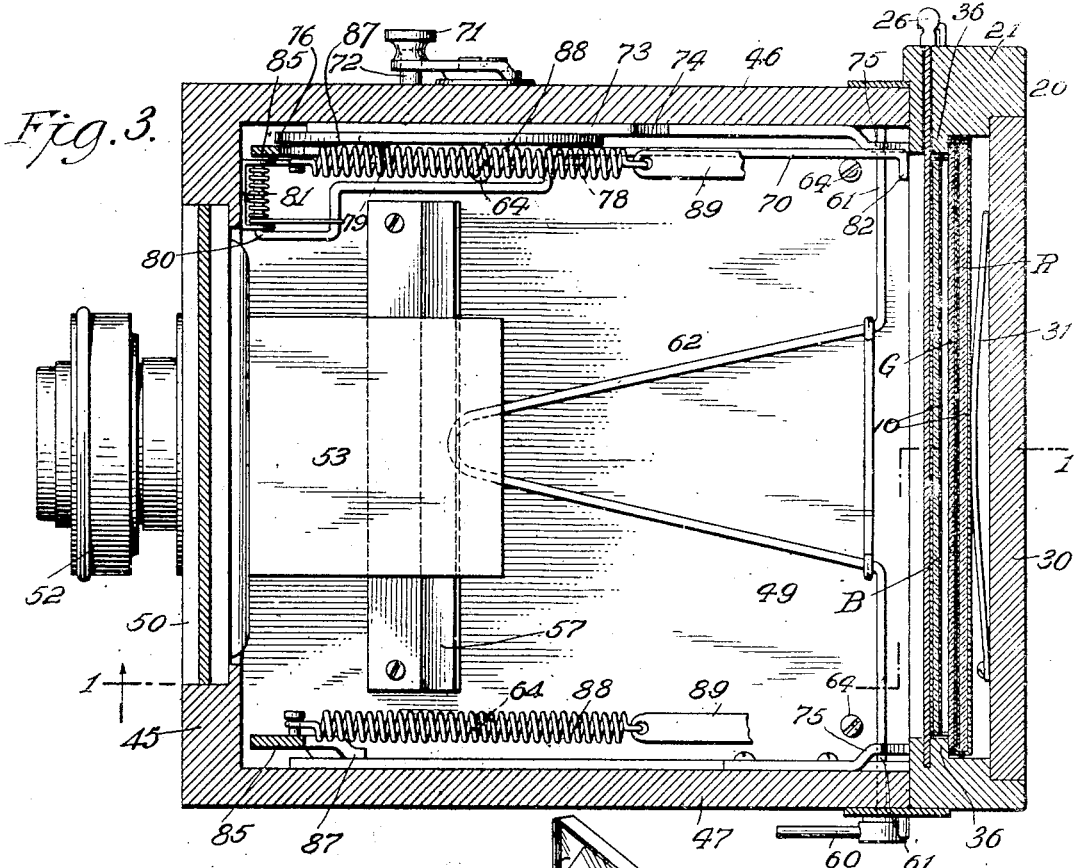
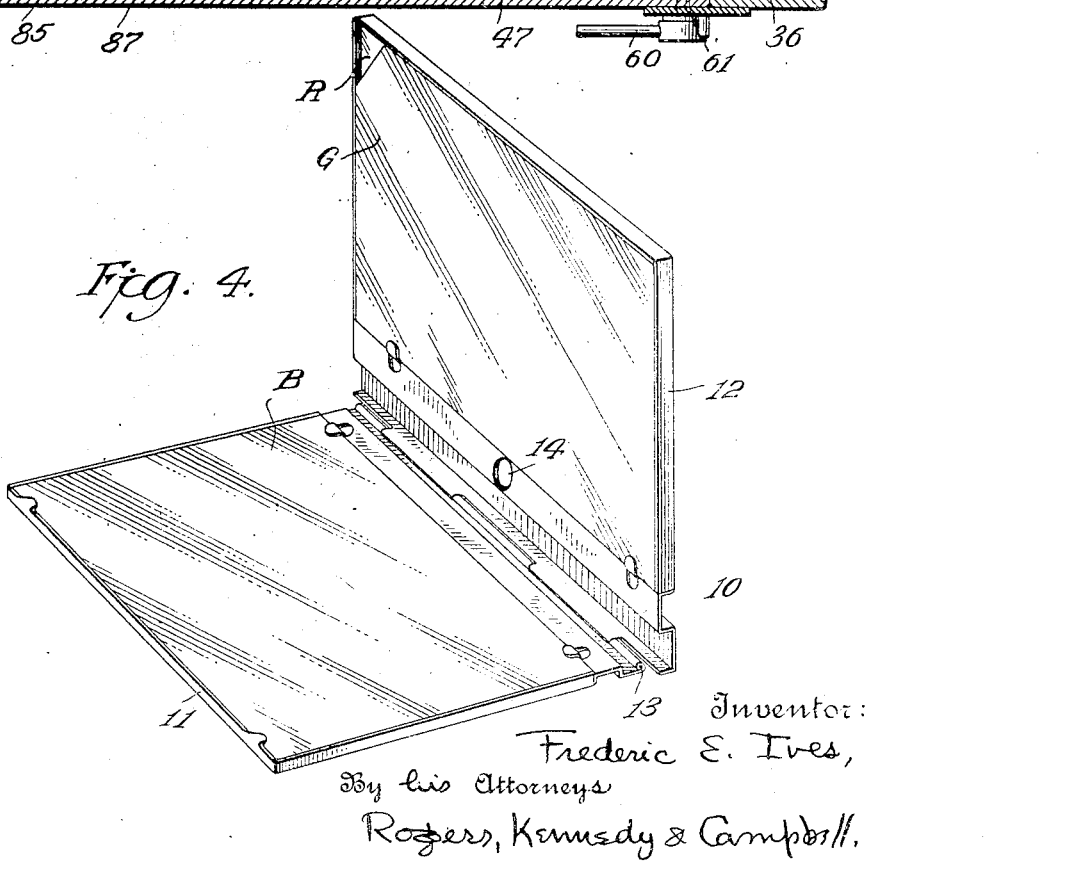

Inventor,
Frederic E. Ives,
By his Attorneys
Rogers, Kennedy & Campbell.

UNITED STATES PATENT OFFICE.

FREDERIC EUGENE IVES, OF PHILADELPHIA, PENNSYLVANIA.

PHOTOGRAPHIC CAMERA.

1,287,327.  Specification of Letters Patent.  Patented Dec. 10, 1918.

Application filed February 17, 1916. Serial No. 78,864.

*To all whom it may concern:*

Be it known that I, FREDERIC E. IVES, a citizen of the United States, residing at Philadelphia, in the county of Philadelphia and State of Pennsylvania, have invented certain new and useful Improvements in Photographic Cameras, of which the following is a specification, reference being had therein to the accompanying drawing.

This invention relates to photographic cameras.

The novel features herein are shown embodied in a camera designed for color photography, and more particularly to that sort of color photography camera which may be termed a multiple camera, in which a plurality of sensitive plates are simultaneously exposed by means of a single lens or aperture. The novel features hereof, however, may be useful to a large extent in photographic cameras generally, and therefore the present invention is not intended to be entirely restricted to color photography.

Among the objects of the present invention is the general improvement in construction, operation and effectiveness of the class of cameras referred to.

A particular object is to afford a more simple and effective multiple camera of the kind in which the sensitive plates are held at different sides of the camera during their simultaneous exposure and with an inclined or transparent reflector so arranged that the light rays from the lens will pass partly to one and partly to another of the plates. Such inclined mirror arrangement is not *per se* herein claimed, but is well known in the prior art, being shown, for example, in my prior Patents 980,961 of January 10, 1911, and 1,153,229, of September 14, 1915. In the last mentioned patent two separate inclined mirrors are used, and three separately disposed sensitive plates, while in the first mentioned prior patent a single inclined mirror suffices, and the plates are disposed at only two separate locations. It is a specific object hereof to improve the last mentioned kind of camera.

While the two-color system of color photography might be carried out by the present invention, I prefer the three-color system, and have therefore herein shown a camera adapted thereto, there being two sensitive plates disposed at one location and a third plate at another location during exposure, somewhat analogously to said prior Patent 980,961.

A particular object hereof is to provide in the kind of camera referred to an improved and more effective and convenient means for holding a plurality of plates such that one may stand at an angle to the others during exposure, and preferably so that all the plates may be normally compactly disposed or held within a single flat plateholder.

Another particular object is to provide a novel arrangement of inclined transparent reflector such that it may be readily, conveniently and accurately set into and removed from its inclined position between the separately disposed sensitive plates.

Another particular object hereof is to provide an effective and convenient manipulating mechanism whereby, when the sensitive plates have been properly disposed at an angle to each other within the camera, the reflector may be caused to shift into its operative position and afterward the reflector may be returned to inoperative position, prior to the resumption by the sensitive plates of their original position within the plate-holder.

Further objects and advantages of the present improvement will be elucidated during the hereinafter following description of one form or embodiment of the present invention, and further advantages of the disclosed structure will be apparent to those skilled in the art.

In the accompanying drawings forming a part hereof, Figure 1 constitutes in part a side elevation of the camera interior and in part a vertical section taken on the plane 1—1 of Fig. 3. This figure shows the parts in initial position before either the sensitive plates or the inclined mirror have taken their operative positions.

Fig. 2 is a view similar to Fig. 1, but showing the parts in the position assumed by them when operative or ready for exposure.

Fig. 3 is in part a plan view of the interior mechanism and in part a horizontal section on the plane 3—3 of Fig. 1.

Fig. 4 is a perspective view of a "plate pack" adapted to be used in the plateholder shown in the other figures, and indicated in its open position assumed during exposure.

Figure 5:
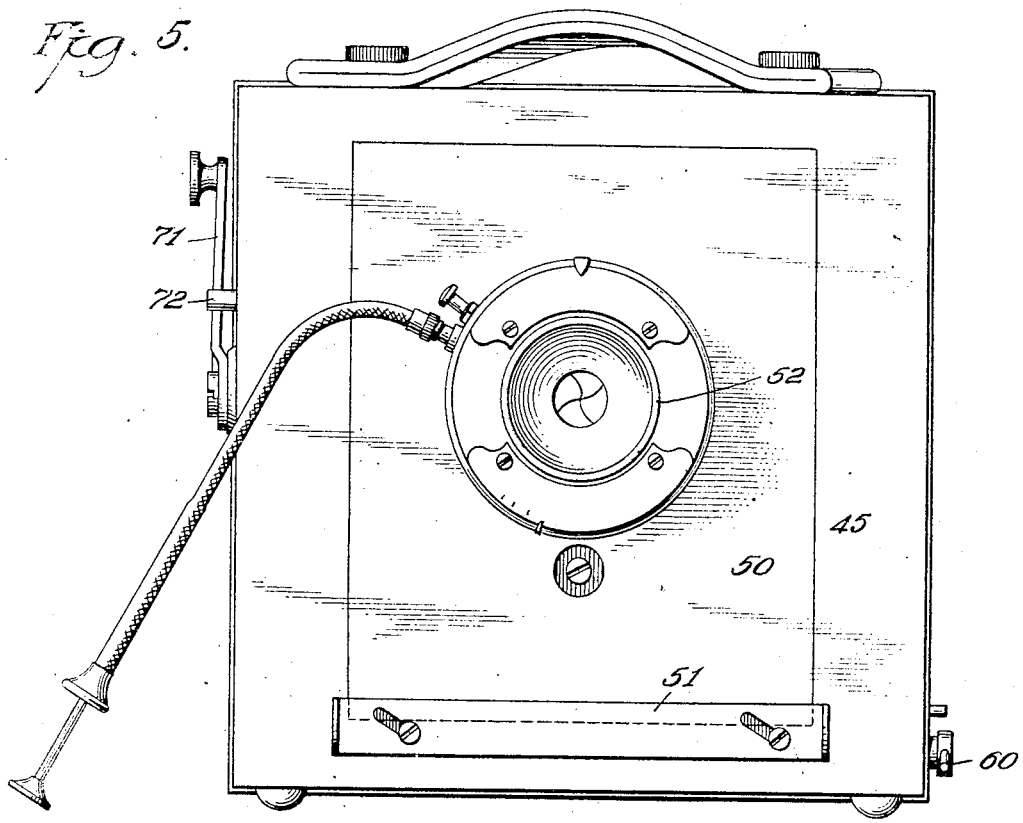
Fig. 5 is a front elevation of the camera shown in the other figures.

It will be convenient herein to first describe the plate pack, that is, the assembled sensitive plates and the device in which they are temporarily held or packed, which are shown separately in Fig. 4 and in the plateholder and camera in Figs. 1, 2 and 3; and to thereafter describe the plateholder shown in Figs. 1, 2 and 3, and thereafter the camera body or box itself, together with the front board, lens mounting and light shields; and finally the operating or manipulating mechanism for opening or closing the plate pack and adjusting the transparent reflector into and from operative position, shown in Figs. 1, 2, 3 and 5.

In the following description the three-color system of color photography will be assumed, although it will be obvious that the invention might be employed for the two-color or four-color system. In the three-color system it is customary to prepare three negatives which may be termed the red-selection negative, the green-selection negative and the blue-selection negative, respectively, and therefore three corresponding plates sensitized to these three primary colors are to be employed. It is obvious that these plates may be specially sensitized for the respective colors which are to make impression upon them, or the selection of colors might be otherwise attained, for example, by the interposition of transparent color screens or layers. In the present embodiment it is assumed that both special sensitization and color screens are employed for one or another of the sensitive plates. For convenience hereinafter the three sensitive plates may be respectively referred to as the red-selection plate R, the green-selection plate G and the blue-selection plate B.

It is obvious that the order of arrangement or relative position of the three plates may be varied, but as a convenient illustration I have herein shown an arrangement wherein the red-selection plate and the green-selection plate are arranged face to face vertically at the rear and parallel to the rear end of the camera, while the blue-selection plate is arranged during exposure substantially at right angles to the other two plates. The green-selection plate is located in front of and face to face with the red-selection plate, so that the light from the lens passes through the former before striking the latter.

The device or retainer 10 by which the several sensitive plates are held in proper relation in the form of a pack may be a very cheap bent metal structure composed merely of two members, the front member 11 and the rear member 12, hinged together at 13, so that the pack may be closed, as seen in Figs. 1 and 3, or opened, as seen in Figs. 2 and 4.

The front metallic member 11 of the plate pack device is shown as shaped with flanges at the four sides so as to form a shallow pocket in which the blue-selection plate B is snugly held by little metallic tabs near the four corners. The plate is held with its sensitive side facing inwardly or rearwardly when the pack is closed, or upwardly, as seen in Figs. 2 and 4, when in exposing position.

The rear plate pack member 12 is similarly shaped with edge flanges, but of slightly greater width so as to form a double depth pocket, which, as shown, contains the red-selection and green-selection plates, which, as stated, preferably face each other, so that the sensitive surfaces will be in the same focal plane. The plates R and G are held in the rear pack member 12 by small metallic tabs only at their lower edges, their upper edges being unsecured except by the hereinafter described coöperation with the plateholder. This arrangement permits the plates R and G to be swung slightly apart in the developing room so as to permit simultaneous development of all three plates by the use of the plate pack as a supporting means. It will be noticed that the middle sensitive plate G has one corner lopped off, and this is for purposes of coöperation with devices in the developing vessel.

For the purposes of proper coöperation with the plateholder to be described, the following further features are incorporated in the plate pack. The hinge 13 is arranged to stand downwardly slightly with respect to the rear member 12, as more clearly seen in Fig. 1. The front member 11 is of narrower width than the rear member 12, and the blue-selection plate is of correspondingly narrower width than the other plates, as seen in Fig. 3. Also the front member is of slightly lesser height or vertical dimension, as seen in Fig. 1, but this is effected without any sacrifice in the height of the blue-selection plate, since its holding pocket extends further downwardly toward the hinge than does the pocket for the other plates. The rear member 12 is apertured at 14 for admitting a pushing device for swinging the front member and plate outwardly.

The plateholder 20 comprises the hollow square frame 21 having the usual camera engaging devices such as external grooves 22 coöperating with fixed flanges or guides 23 on the camera body. A bent plate spring 24 is shown arranged to press downwardly on the plateholder, and an analogous spring 25 is arranged to press forwardly upon the plateholder. The result of these two springs is that the plateholder is invariably brought into exactly the same position when inserted in the camera, which is important in order to secure the exact requisite relative positioning of the sensitive plates and inclined transparent reflector. At the plateholder's front side a draw slide 26 is provided in the usual way, it normally excluding light at the front, as seen in Figs. 1 and 3, but being adapted to be removed, as seen in Fig. 2, to permit the sensitive plates to be opened out and exposed. When closed it acts as a retainer or restrainer, preventing the plate and pack member swinging into the camera.

The plateholder is specially constructed at its interior to receive and coöperate with the plate pack heretofore described. In the first place, it is provided with a removable back 30, which permits opening the plateholder at the rear to insert the plate pack. This arrangement is far superior to and less complicated than any arrangement for loading the plate holder from the front. A flange 28 at the top of the removable back and a locking finger 29 at its lower edge securely hold it in light-tight position, as seen in Figs. 1 and 2. At its interior side the back 30 is provided with two bent plate springs. The heavy spring 31 near the middle serves to press forwardly against the plate pack to hold it to its seat. The light spring 32 near the lower edge carries a pin 33 adapted to project through the aperture 14 of the rear plate pack member 12 and to bear upon the front plate pack member 11 and force it outward when the plateholder draw slide 26 is removed.

The plateholder at its interior is provided with ledges and recesses to coöperate with the plate pack. Thus, a horizontal recess 35, Figs. 1 and 2, is shown along the bottom of the plate-holder frame adapted to receive the flange-like hinge 13 of the plate pack. This not only assists positioning the pack within the plateholder, but prevents the pack being inserted wrongly, since there is no other recess which could accommodate the hinge 13. The plateholder is also provided with vertical side ledges 36, as seen in Fig. 3, against which the vertical side edges of the rear member 12 of the plate pack bears. In this way the sensitive plates R and G are held firmly in place, whereas the sensitive plate B and the front plate pack member 11, which are of narrower width, may swing forwardly between the ledges 36 and about the hinge 13 into the position shown in Fig. 2. These side ledges 36 are supplemented by a top ledge 37, Figs. 1 and 2, which similarly serves to retain and support the rear plate pack member while permitting the forward member to swing.

The interior structure, therefore, comprises ledges at three sides, which retain the rear member of the plate pack, and a recess at the fourth side to receive the lower flange or hinge of the plate pack. The mode of charging the plateholder in the dark room is simply to remove the back piece 30 while the draw slide 26 is in place, and to then insert the plate pack with its hinge under the recess 35, the plate pack naturally assuming the position shown in Figs. 1 and 3, and then restoring and locking the back piece 30. The plate packs, including the metallic devices and the sensitive plates, may be sold commercially in condition ready to insert in the plateholder.

When the plateholder draw slide is removed, the front plate pack member and the sensitive plate B may swing outwardly by the force of gravity or otherwise, as by the spring device 32—33, until assuming the position shown in Figs. 2 and 4 at right angles to the sensitive plates R and G, which is the proper position for the plates to coöperate with a transparent reflector set at 45 degrees between them. It has been explained that, although the plate B has the same dimension as the vertical dimension of the other plates, it is set slightly nearer the hinge. This does not, however, necessitate any lack of registry between the three final images, since the transparent reflector may be set in such relation to the hinge or axis, and the hinge may be arranged in such relation to the sensitive surface of the plates R, G, B, as to afford exact registry; and the parts are supposed to be so arranged in the illustrative drawings herein.

As will be seen, the camera hereof may be employed either in the position shown, or turned at right angles in case the plates are not exactly square and an upright picture is desired, and one object of the present invention is to afford a construction giving this advantage. Therefore, as will be later described, the camera is provided with devices coöperating with the plateholder and plate pack whereby the complete swinging open of the front member of the pack may be effected or insured and whereby, after exposure, the same may be swung back within the plateholder to permit the restoration of the draw slide.

The transparent reflector 40 is movably located within the camera, and, as previously indicated, may be shifted between its operative or inclined position, seen in Fig. 2, where it stands between the two members of the plate pack, to a retracted position, for example, near the top wall of the camera, as seen in Fig. 1. In its retracted position it permits the swinging open of the plate pack and the subsequent closing thereof. Generally speaking, I do not claim the broad principle of shifting a transparent reflector into the angle formed between different sensitive plates, as the same in one form is indicated in my prior Patent 980,961, but I claim the novel arrangements, combination and mechanism herein shown and described. In said prior patent the red-selection plate is held at the rear and the blue- and green-selection plates face to face at one of the adjacent sides of the camera. Herein I prefer the different arrangement disclosed in which only one of the plates, namely, the blue-selection plate, is swung forwardly from the plate holder at the rear. By this arrangement I am permitted the desirable feature of employing for the transparent reflector a sheet of yellow stained glass. This has not merely the desirable advantage of entirely subtracting the most actinic, namely, the blue, rays from the light passing rearwardly to the red- and green-selection plates, but it further prevents the objectionable double reflection of images to the most sensitive or blue-selection plate. Rays of light from only the front surface of the reflector pass to the blue-selection plate, since any light passing twice through the plate and reflected from the rear surface will have the blue rays completely eliminated.

The camera body or box is shown as having a front wall 45, right and left walls 46 and 47, and top and bottom walls 48 and 49.

Figure 6:
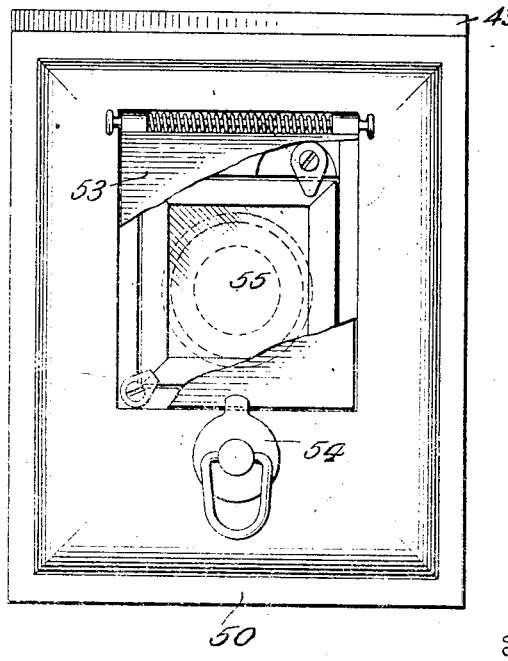
Fig. 6 is an interior or reverse view of the removable front board or lens carrier of the camera.
Figure 7:
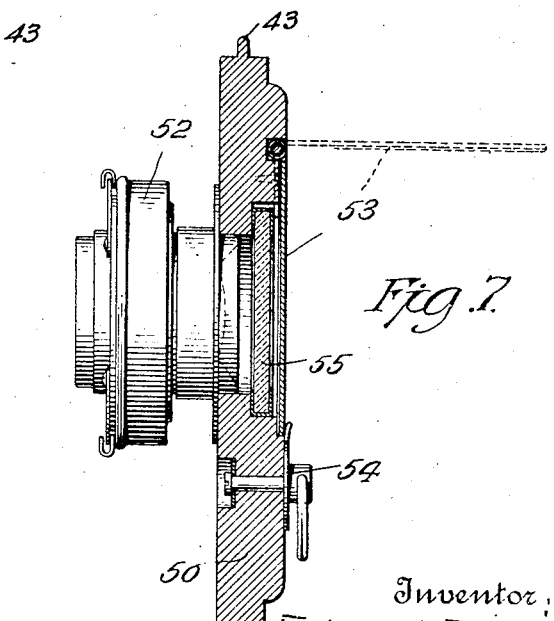
Fig. 7 is a central vertical section of the parts shown in Fig. 6.

In the front wall 45 of the camera is a square aperture containing a removable front board or lens carrier 50. This at its upper side has a tongue 43 so arranged with respect to a groove 44 in the camera wall that the front board may be put in with the lens outward, as indicated in the figures, or reversely with the lens inward for protection of the lens when not in use. Fig. 5 shows a sliding lock device 51 for securing the lens board 50 in place. The lens 52 is indicated by the usual lens mountings, and the usual shutter diaphragm and exposing devices may be employed. The rear side of the lens board 50 is provided with a shield 53, which may be closed downwardly and secured by locking device 54, as seen in Figs. 6 and 7, or may be permitted to spring upwardly to its shielding position indicated in Figs. 1 and 2, and in dotted lines in Fig. 7. This device serves not only to protect the optical devices when closed, but when open permits the camera to be employed for ordinary photographic work and prevents light rays from reaching the retracted transparent reflector 40, which otherwise might be reflected from it to the injury of the sensitive plates. Fig. 1 shows how the shield 53 completely excludes light from the retracted reflector 40.

Carried on the lens board and preferably behind the lens is shown a transparent color screen 55, which may sometimes be used with advantage. For example, this may be a piece of transparent glass stained of an orange-pink color for the purpose of reducing the actinic effect of the blue, and to some extent the green, rays of light, so as to give better equalization of photographic results upon the three sensitive plates, which are unequally sensitive to their respective colors.

A fixed light shield 57 is shown upstanding from the bottom 49 of the camera in such position as to prevent the passage of light directly from the lens to the blue-selection plate at the bottom, so that there will be no interference with the reflected image thrown thereon.

The following convenient device may be employed for forcing the front member 11 of the plate pack to swing back into the plateholder to permit the insertion of the plateholder draw slide 26 after an exposure has been made. An exteriorly accessible finger 60 operating through an interior shaft 61 at the rear of the camera bottom serves, when manipulated to swing a V-shaped wire device 62, which thereby may be swung upwardly at will so as to swing the plate pack member 11 upwardly for returning it to the plateholder. This device 60, 61, 62 may be termed a closer.

There are adjuncts shown or to be understood, such as a series of rests, or example, in the form of adjustable screw stops 64 which receive the plate pack member 11 when opened downwardly to exposing position, as seen in Fig. 2.

The remainder of the illustrated apparatus has to do with the operation of the transparent reflector 40, already mentioned, and the operation of a movable device 70, which may be termed an opener, the function of which is to completely open the plate pack member 11, or to insure its remaining in its illustrated open position of Fig. 2 during exposure. The means for operating the reflector 40 and the means for operating the opener 70 are herein conveniently combined into a single mechanism for harmoniously operating both of these instruments. The manipulation may be effected by an exterior handle or lever, such as that shown at 71 at the right-hand wall 46 of the camera. In Figs. 1, 3 and 5, the lever 71 is shown in its normal position resting against the rear side of stop pin 72. The operation of the lever is to swing it clear around until contacting the stop pin at the other side, as indicated in Fig. 2.

As arranged the operation of the manipulating lever 71, when swung as described, is first to move downwardly the opening device 70 from the position shown in Figs. 1 and 3 to the position shown in Fig. 2. It being assumed that the plateholder has been previously opened and the front plate pack member swung outwardly or slightly outwardly, the opener serves to complete the outward movement thereof and to firmly hold the blue-selection plate B in its proper position, shown in Fig. 2. The continued movement of the control lever 71 serves to first swing downwardly the rear end of the reflector 40 and to then slide it in its own plane, these two movements serving to bring the reflector into its Fig. 2 position proper for exposure. The reverse or return movement of the control lever first lifts the reflector back to initial position and then restores the opener, leaving the plate pack member free to be closed by the closing device 60 into the plateholder.

The following convenient mechanism may be employed for carrying out these described operations of the reflector and opener:

A triangular fixed sheet metal piece 73 is suitably secured to the right-hand wall 46 at its interior, this serving as a bearing for part of the mechanism to be described, and also affording a rest or stop for the reflector in its final or operative position. Thus, as seen in Fig. 2, the edges of the reflector rest against the metallic projections 74 and 75, the latter of which, as seen in Fig. 3, is offset slightly toward the interior. Similar supporting pieces at the opposite wall 47 are employed.

One of the movable members of the operating mechanism is what may be termed the control disk 76 pivoted to the fixed metallic piece 73 at 77, where is provided a short stud or shaft extending through the camera wall to where it carries the control lever 71, so that the lever may turn the disk. The disk is provided with two inwardly extending operating pins 78 and 79.

Now will be described the action of the control mechanism upon the opener 70. This opener is shown in the form of a bent wire suitably fulcrumed at 80 near the upper front right-hand corner of the camera and having a spring device 81 tending to pull it downwardly. At its front end the opener 70 has a slight offset portion or finger 82 capable of overlying the blue-selection plate to a slight extent. The opener 70 is centrally bent, as indicated in Figs. 1, 2 and 3, for the purpose of properly cooperating with the operating pins 78 and 79, as now to be described.

Normally, as seen in Fig. 1, the opener 70 is held in its elevated position by the pin 78 on the control disk. The operative movement of the external control lever turns the disk in a clockwise direction, looking at Figs. 1 and 2. By this movement the pin 78 is lowered, allowing the spring 81 to draw the opener 70 downwardly until the latter rests upon the opened plate B, as seen in Fig. 2. As soon as this position of the opener is attained, the further movement of the pin 78 is of no effect, but subsequently the pin 79 in its movement acts to forcibly or positively press against the opener 70, thereby finally forcing the opener and the plate B to their required positions, as seen in Fig. 2.

This opener mechanism coöperates with the opening device 32—33, since the latter insures the partial opening of the plate pack when the draw slide is removed, so that, as will be readily perceived from Fig. 1, the opener finger 82 is bound to enter behind the sensitive plate B before going through its described movements, whatever the position of the camera.

The shifting of the reflector 40 and its mountings will now be described. It is partly supported by an upstanding inverted U-shaped frame comprising two side bars 85 and top bar 86. This frame is interiorly fulcrumed at both sides of the camera at 87. Just below the top bar 86 the side bars 85 are notched, as shown, to receive the foremost edge of the reflector 40. By means of these notches and a pulling spring 88 at each side and a pair of hook members 89 between the springs and the rearmost edge of the reflector the latter is held to the swinging supporting frame 85, 86. The springs 88 not only tend to hold the reflector in place by pulling it toward the frame, but tend to swing the plate downwardly to a certain extent, which is permitted by the open nature of the notches before referred to. The reflector, however, as shown in Fig. 1, is normally held in its highest position and against the tension of the springs 88 by the rim, which is shown concentric, of the control disk 76. This concentric rim is not continuous, but is shaped so that, upon turning the disk, it eventually permits the reflector to swing downwardly. The concentric portion of the disk, however, continues, as shown, for such extent that the reflector is locked in its normal or upper position until the opener 70 has moved downwardly out of the path of the reflector. The downward movement of the reflector does not commence until the point 90 of the disk periphery reaches the reflector and, since the concentric shape there ceases, the spring is enabled to act to lower the reflector. After the corner 90 has passed the point of contact with the reflector and the latter has commenced to swing downwardly, the operating pin 78 enters a slot formed at 91 in the swinging frame 85 and the final rotary movement of the control disk thereby serves to swing the frame from the Fig. 1 position rearwardly to the position shown in Fig. 2. This action enables the reflector to move cornerwise snugly into its final position, determined by the guides or stops 74 and 75.

The complete sequence of operations in taking a colored photograph with the described camera may be as follows. After loading and closing the plateholder as described, and inserting it into the camera in the position shown, the camera is directed toward the subject, and thereupon the draw slide is extracted from the plateholder. Immediately the spring pin 33 forces the sensitive plate B and the front member of the plate pack outwardly from the plateholder into the camera. The operator thereupon turns the control lever 71 from its normal position, shown in Figs. 1, 3 and 4, slowly around to its final position during which the following operations occur. First the pin 78 descending permits the opener 70 to descend, its finger 82 entering behind the plate B and causing the plate to swing completely outward to the Fig. 2 position, if it has not already done so by gravity. About the time the opener reaches this position, the disk 76 has turned so far that its concentric portion no longer supports the reflector, which thereupon swings downwardly at its rear end. After the reflector rear end has swung approximately midway, the operating pin 78 enters the slot of the frame side bar 85, and thereafter the reflector is shoved rearwardly simultaneously with its downward swinging. This continues until the parts reach the Fig. 2 position, by which time the pin 79 has come on top of the opener 70 and insured the proper positioning of the plate B. The lens is then operated to expose the picture for a suitable period of exposure. After the lens is again closed, the operator reverses the movement of the control lever, which first restores the reflector and then the opener to normal positions. Finally the manipulating finger 60 is operated to swing the plate pack member containing the plate B into the plateholder, whereupon the draw slide is thrust back into the plateholder, which may then be removed from the camera.

The action of the apparatus upon a beam of light entering the camera may be as follows: A beam of white light will be assumed, this comprising all of the primaries. The light passes through the lenses of the camera and then through the screen 55. If this be of an orange-pink color, as stated, it will by subtraction suitably reduce the amount of blue light, and to a slight extent decrease the amount of green light. In other words, the beam of light, after passing through the screen, predominates in red, which is requisite on account of the relatively poor actinic or photographic quality of red light. The beam of light then strikes the 45-degree transparent reflector, and a portion of it is transmitted and a portion reflected. The reflected portion, which is unchanged except in quantity, passes to the blue-selection plate B, which may be a very tenuous silver bromid film, and it need not be specially sensitized, as such film is comparatively insensitive to red and green. The portion of the light passing through the yellow transparent reflector 40 is converted by the complete subtraction of the blue element of the light. The transparent reflector thereby serves as a color screen. The yellow color is the complement of the blue, known as minus-blue, and this freely admits the passage of red and green light. The light then travels rearwardly to the green-selection and red-selection plates, which are located face to face at the proper focal plane. The foremost of the two plates has its active surface specially sensitized for green light and rendered practically insensitive to red. Thereby the image or negative secured therefrom is truly representative of the green portion of the subject. For practical purposes in view of the close proximity of the green-selection and red-selection plates, the former may be considered as substantially transparent, the light rays passing through it sufficiently freely to affect the red-selection plate to the rear. The latter should be specially sensitized for red light. In case it may not be possible to render the red-selection plate completely insensitive to green light, I prefer to coat the face of one of the plates with a temporary or soluble red color layer or screen to exclude the green light from the red-selection plate. The proper decrease of sensitization and the proper arrangement of transparent screens enables three negatives to be obtained, which truly and in proper proportions are representative of the red, the green and the blue elements of the subject, respectively.

By means of a suitable plateholder adapted to position a plate in the focal plane, the described camera may be employed for ordinary photography, the transparent reflector 40 being left in its retracted position and the light shields preventing any improper action. The lens of the camera may be of universal focus, if it is desired to dispense with focusing operations.

The plate pack described herein is adapted to coöperate with a special developing rack in which the plate pack is placed, the rack automatically causing the plate pack to open out, the three plates separating like the leaves of an open book and being locked in this position while the rack and plates are immersed in a tank containing the developing solution. After development the negatives may be used in many known ways for the production and blending of monochrome positives of the secondary colors, which in their combined condition yield a multicolor photograph of the original subject, substantially in its true or natural colors.

It will thus be seen that I have described a photographic camera embodying the principles and attaining the objects and advantages of the present invention. Since many matters of arrangement, combination, mode of operation and detail and other features may be variously modified without departing from the principles involved, no limitation to such features is intended excepting in so far as set forth in the appended claims.

What is claimed is:

1. In a photographic camera means for initially holding three superposed plates vertically at the camera rear end, said holding means adapted further to release the foremost plate while maintaining the other two vertical whereby the foremost plate may relatively swing inward substantially at right angles to the other two, a transparent reflector, and means for adjusting it slantingly into the angle between the plates.

2. In a photographic camera means for holding superposed red and green-selection plates vertically at the camera rear end during exposure, and a blue-selection plate at one of the camera sides, and a transparent reflector held in the angle between the plates.

3. In a photographic camera means for holding superposed red and green-selection plates vertically at the camera rear end during exposure, and a blue-selection plate at one of the camera sides, and a transparent yellow reflector held in the angle between the plates.

4. In a photographic camera means for holding superposed red and green-selection plates vertically at the camera rear end, and a blue-selection plate at one of the camera sides, an orange-to-magenta transparent screen interposed in the light near the lens, and a transparent yellow reflector held in the angle between the plates.

5. In a photographic camera means for initially holding a plurality of plates in superposed relation, said holding means adapted further to release part of said plates while holding the remainder whereby part of the plates may relatively swing within the camera to a position at an angle to the remainder, a transparent reflector, and means for shifting the reflector with a swinging motion into the angle between the plates.

6. In a photographic camera means for initially holding a plurality of plates in superposed relation, said holding means adapted further to release part of said plates while holding the remainder whereby part of the plates may relatively swing within the camera to a position at an angle to the remainder, a transparent reflector normally in retracted position near one wall, and externally controlled mechanism for shifting the reflector with a combined advancing and swinging motion into the angle between the plates.

7. In a photographic camera means for initially holding a plurality of plates in superposed relation, said holding means adapted further to release part of said plates while holding the remainder whereby part of the plates may relatively swing within the camera to a position at an angle to the remainder, a transparent reflector normally in retracted position near one wall, and externally controlled mechanism for shifting the reflector with a combined advancing and swinging motion into the angle between the plates; said mechanism comprising a movable frame, means movably connecting the reflector to the frame, and devices for causing the frame to move and the reflector to move relatively to the frame.

8. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger adapted to swing one of said plates into fully opened position, and means for shifting the reflector into the angle between the plates.

9. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger consisting of a movable interior finger externally controllable and adapted to swing one of said plates into fully opened position, and means for shifting the reflector into the angle between the plates.

10. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger adapted to swing one of said plates into fully opened position, and a single externally controlled mechanism for operating said plate-swinger and for shifting the reflector into the angle between the plates.

11. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger adapted to swing one of said plates into fully opened position, and a single externally controlled mechanism for operating said plate-swinger and for shifting the reflector into the angle between the plates, said mechanism comprising a handle, and connections whereby movements of the handle first operate said plate-swinger and then shift the reflector into its final position.

12. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger adapted to swing one of said plates into fully opened position, and a single externally controlled mechanism for operating said plate-swinger and for shifting the reflector with a swinging motion into the angle between the plates.

13. In a photographic camera means for initially holding a plurality of plates in superposed relation, said holding means adapted further to release part of said plates while holding the remainder whereby part of the plates may relatively swing within the camera to a position at an angle to the remainder, a transparent reflector, a plate-swinger adapted to swing one of said plates into fully opened position, and a single externally controlled mechanism for operating said plate-swinger and for shifting the reflector into the angle between the plates, said mechanism comprising a handle, and connections whereby movements of the handle first operate said plate-swinger and then shift the reflector into its final position.

14. In a photographic camera a plate pack composed of front and rear members hinged together, means for holding said pack adapted to release the front member while holding the rear member whereby the front member may be swung open into the camera, a device actuated in a suitable manner for starting such swinging open, and a restrainer for preventing such swinging.

15. In a photographic camera a plate pack composed of front and apertured rear members hinged together, means for holding said pack adapted to release the front member while holding the rear member whereby the front member may be swung so as to permit the front member swinging open into the camera, a device actuated in a suitable manner for starting such swinging open, and a restrainer for preventing such swinging; said device consisting of a spring pin mounted behind the pack and operating through an aperture in the rear pack member.

16. In a photographic camera a plate pack composed of front and rear members hinged together, means for holding said pack adapted to release the front member while holding the rear member whereby the front member may be swung so as to permit the front member swinging open into the camera, a device actuated in a suitable manner for starting such swinging open, and a plate-swinger adapted to engage behind the swingable pack member and swing the same into fully opened position.

17. In a photographic camera a plate pack composed of front and rear members hinged together, means for holding said pack adapted to release the front member while holding the rear member whereby the front member may be swung so as to permit the front member swinging open into the camera, a device actuated in a suitable manner for starting such swinging open, and a restrainer for preventing such swinging; and a transparent reflector having means for shifting it into the angle between the opened plate pack members.

18. In a photographic camera a plate pack composed of front and rear members hinged together, means for holding said pack adapted to release the front member while holding the rear member whereby the front member may be swung so as to permit the front member swinging open into the camera, a device actuated in a suitable manner for starting such swinging open, and a plate-swinger adapted to engage behind the swingable pack member and swing the same into fully opened position; and a transparent reflector having means for shifting it into the angle between the opened plate pack members.

19. In a photographic camera the combination, with the camera body, having a lens at the front end thereof, of means for engaging and holding a plateholder at the rear end of the camera, a plateholder engageable at the camera rear end, the same having a removable back-piece, interior ledges spaced in front of said back-piece, and a draw slide in front of such ledges, whereby a hinged plate-pack may be contained in the plateholder and its narrow front member swung between the ledges into the camera, and a transparent reflector mounted at the interior of the camera to be adjusted into diagonal position in the angle between the plate-pack members.

20. In a photographic camera adapted either for ordinary or color photography the combination of a transparent reflector adapted to be shifted between an inclined position and a retracted position near one wall, and a shield arranged near the forward end of the camera to exclude light passing from the lens to said reflector, when in its retracted position.

21. In a photographic camera adapted either for ordinary or color photography the combination of the camera body having a reversible board at its front side, a transparent reflector adapted to be shifted between an inclined position and a retracted position against a side wall of the camera body, and a shield mounted on said front board at the side toward said camera side wall whereby it may exclude light passing from the lens to the retracted reflector.

22. In a photographic camera a plateholder adapted to hold a plate movably to swing within the camera to a position at an angle to the plateholder, a restraining means for preventing such swinging, optical means for photographically exposing the plate in its inwardly swung position, and an externally controllable closing device for swinging the plate back into position within the plateholder, all substantially as herein described.

23. In a photographic camera a plateholder adapted to hold a plate movably to swing within the camera to a position at an angle to the plateholder, a restraining means for preventing such swinging, and an externally controllable closing device for swinging the plate back into position within the plateholder, said device consisting of a V-shaped swinging member mounted on an axle and an exterior extension to its axle, all substantially as herein described.

In testimony whereof, I have affixed my signature.

FREDERIC EUGENE IVES.

---

Corrections in Letters Patent No. 1,287,327.

It is hereby certified that in Letters Patent No. 1,287,327, granted December 10, 1918, upon the application of Frederic Eugene Ives, of Philadelphia, Pennsylvania, for an improvement in "Photographic Cameras," errors appear in the printed specification requiring correction as follows: Page 8, lines 51–52, 64–65, 76–77, 89–90, claims 15, 16, 17, 18, strike out the clause "so as to permit the front member swinging;" page 9, lines 14–15, 26, claims 22, 23, strike out the clause "all substantially as herein described;" and that the said Letters Patent should be read with these corrections therein that the same may conform to the record of the case in the Patent Office.

Signed and sealed this 21st day of January, A. D., 1919.

[SEAL.]

F. W. H. CLAY,
*Acting Commissioner of Patents.*

Cl. 95—2.